United States Patent Office 3,203,955
Patented Aug. 31, 1965

3,203,955
SURFACE ACTIVE MIXTURES OF POLYOXY-
ALKYLENE COMPOUNDS HAVING A SINGLE
HETERIC POLYOXYPROPYLENE - POLYOXY-
ETHYLENE CHAIN
Donald R. Jackson, Southgate, and Lester G. Lundsted,
Grosse Ile, Mich., assignors to Wyandotte Chemicals
Corporation, Wyandotte, Mich., a corporation of
Michigan
No Drawing. Continuation of application Ser. No.
704,351, Dec. 23, 1957. This application Oct. 9, 1962,
Ser. No. 229,478
3 Claims. (Cl. 260—247.7)

This application is a continuation of our copending application Serial No. 704,351, filed December 23, 1957, which latter application was a continuation-in-part of our then copending application Serial No. 499,214, filed April 4, 1955, both now abandoned.

This invention relates to surface active mixtures of polyoxyalkylene compounds having a single heteric polyoxypropylene-polyoxyethylene chain. In a more specific aspect, this invention relates to new nonionic surface active agents and a method for preparing same wherein the new surfactants are mixtures of conjugated or "block" polymers of propylene oxide and ethylene oxide. The individual compounds in the mixture are characterized by having a heteric polyoxypropylene-polyoxyethylene chain.

Nonionic surface active agents composed of a water-insoluble or hydrophobic nucleus, such as a long hydrocarbon chain or an alkyl-substituted ring compound, e.g. nonylphenol, and a water-solubilizing polyoxyethylene chain are well known in the art. Such surface active agents have excellent properties for many uses, but a disadvantage in this class of materials lies in the inflexibility of the water-insoluble or hydrophobic portion of the molecule. Any alteration in properties attributable to the hydrophobic portion of the surfactant can only be accomplished by selecting a completely different water-insoluble compound with which to condense ethylene oxide. Frequently however, different uses of surfactants require varying surfactant properties which differ only in small increments for the best performance.

An important contribution to the art in this regard is represented by the disclosure of Jackson et al. in U.S. 2,677,700, issued on May 4, 1954. Jackson et al. disclosed new surfactant compositions which are exemplified by the mixtures obtained by sequentially condensing propylene oxide with a lower molecular weight reactive hydrogen compound having only a single reactive hydrogen atom, such as n-propanol, to produce a water-insoluble, hydrophobic polyoxypropylene glycol ether, and then condensing ethylene oxide with the polyoxypropylene glycol ether in an amount sufficient to solubilize the polyoxypropylene glycol ether and provide surface active properties. With the benefit of Jackson et al.'s disclosure, the art can obtain surface active agents with properties which can be widely varied since both the hydrophobic and hydrophilic portions of the molecule can be altered by simply controlling the amounts of propylene oxide and ethylene oxide used in preparing the compounds. The compositions disclosed by Jackson et al. have opened the door for applications of nonionic surfactants derived from alkylene oxides in uncounted ways because of the new flexibility in chemical and physical properties that has been afforded.

Room for further improvement still exists, however. Even with the flexibility of chemical and physical properties afforded by the compositions of Jackson et al. wherein propylene oxide is initially condensed with a low molecular weight reactive hydrogen compound, and ethylene oxide in a solubilizing amount is then condensed therewith, we have found that specific combinations of properties desirable in a surfactant could not be attained in the compositions of Jackson et al. Keeping in mind the extremely wide variety of functions that nonionic surfactants are called upon to serve, it can well be appreciated that new uses are encountered with increasing frequency wherein new combinations of properties are required. Particularly in the field of formulated detergent compositions, new combinations of such important properties as detergency, cloud point and foaming (or nonfoaming) are desired which are not obtainable in any specific composition of Jackson et al.

An object of this invention, therefore, is to provide mixtures of novel polyoxyalkylene compounds.

A further object is to provide new surface active agents derived from conjugated or "block" polymers of ethylene oxide and propylene oxide which have new combinations of surface active properties.

A still further object is to provide a new method for preparing surface active agents derived essentially from ethylene oxide and propylene oxide.

As was stated above, the surface active agents disclosed by Jackson et al. are prepared by initially condensing propylene oxide with a low molecular weight reactive hydrogen compound, such as n-propanol or n-butanol, so as to produce a hydrophobic polyoxypropylene glycol ether, and then condensing ethylene oxide with the hydrophobic polyoxypropylene glycol ether. We have discovered, however, that a completely new series of surface active agents, from the viewpoint of chemical and physical properties, can be obtained by employing a mixture of propylene oxide and a minor proportion of ethylene oxide, such as about 5–40 weight percent, in preparing the initial condensate with the reactive hydrogen compound instead of employing propylene oxide, itself, for this purpose. Surprisingly, it has been found that when compositions of the invention and compositions according to Jackson et al. are prepared with the same molecular weight for the hydrophobic oxypropylene chain and with the same weight percent of the solubilizing oxyethylene chain, the combination of properties obtained in each case is completely changed. There is no definite pattern or trend which can be observed in the comparison of detergency (carbon soil removal value), foam height and cloud point of the compositions of the invention and the compositions of Jackson et al.

However, it will be observed from the tests that we have made that the compositions of the invention are distinctly different from otherwise comparable compositions of Jackson et al., i.e., they exhibit a distinctly different combination of the properties tested.

Thus, it will be readily appreciated that a further advance in the surface active agent art is represented by the compositions of this invention since flexibility in chemical and physical properties is increased. Frequently, success or failure in the use of any particular surface active agent depends on the presence of a precise balance of surface active properties in the surfactant. The range of properties that can be obtained in the surfactants of Jackson et al. based on blocks of oxypropylene and oxyethylene chains has been significantly expanded by the present invention wherein a minor proportion of ethylene oxide is incorporated into the propylene oxide used to form the hydrophobic element of the surface active compositions.

Before discussing the new compositions and method of this invention in detail, it would be well to amplify the terms "mixtures," "conjugated" and "block" as used in this specification and in the appended claims to describe the compositions of the invention. It is well recognized in the field of alkylene oxide chemistry that when one subjects a reactive hydrogen compound to oxyalkylation, such as oxyethylation or oxypropylation, what is actually produced is a polymer of the alkylene oxide except for the terminal group. Furthermore, where the amount of the alkylene oxide employed is relatively large, one does not obtain a single molecular compound having a defined number of oxyalkylene radicals, but rather, one obtains a "mixture" of closely related homologues wherein the statistical average number of oxyalkylene groups equals the number of mols of the alkylene oxide employed and the individual members present in the mixture contain varying numbers of oxyalkylene gorups. Thus, the compositions of this invention are "mixtures" of compounds which are defined by molecular weight and weight percent. When molecular weight is referred to in this specification and claims, there is meant the average theoretical molecular weight which equals the total of the grams of proylene oxide employed per mol of oxyethylene-reactive hydrogen compound condensate. In the examples of materials given herein according to the Jackson et al. patent, the theoretical molecular weight of the oxypropylene chain equals the total grams of propylene oxide per mol of reactive hydrogen compound.

The compositions of Jackson et al. and of this invention are such mixtures which are further defined as being "conjugated" or "block" polymers of alkylene oxides. The characterizing feature of the compositions of the invention, however, is that the oxypropylene polymer is a "heteric" polymer of propylene oxide and a small proportion, such as 5–40 weight percent, of ethylene oxide. The term "heteric" as applied to alkylene oxide polymers has come to mean that the polymers vary in internal configuration from molecule to molecule, such variation arising out of a randomness of the distribution of the oxypropylene and oxyethylene groups resulting from the reaction of a mixture of propylene oxide and ethylene oxide with a reactive hydrogen compound.

As has been noted hereinabove, the starting material for preparing the compositions of the invention is a low molecular weight reactive hydrogen compound. This fact is of the utmost importance in distinguishing the compositions of the invention from surface active agents of the prior art wherein alkylene oxides have been employed for various purposes. Jackson et al. disclose surface active compositions wherein the hydrophobic element derived its hydrohobic properties strictly from a defined oxypropylene chain. Compositions of the prior art wherein ethylene oxide is condensed with an initially water-insoluble, relatively high molecular weight and hydrophobic reactive hydrogen compound, or even where propylene oxide is initially condensed with such a starting material followed by oxyethylation, obviously cannot derive the hydrophobic characteristic necessary in a surface active agent from an oxyalkylene chain since such a characteristic is already provided by the starting material.

For example, U.S. 2,174,761 discloses surfactant compositions derived by condensing propylene oxide with cetyl alcohol and subsequently condensing ethylene oxide therewith. Cetyl alcohol and similar higher molecular weight reactive hydrogen compounds are sufficiently hydrophobic by themselves so that a surfactant is obtained merely by condensing ethylene oxide with such a reactive hydrogen compound and without employing any propylene oxide at all. Thus, the long hydrocarbon chain in cetyl alcohol supplies the hydrophobic characteristic for the surfactant and not a properly defined oxypropylene chain as set forth in the definitions of the compositions of this invention. So also in the compositions of this invention, the hydrophobic characteristic is directly attributable to the defined heteric oxypropylene-oxyethylene chain and the reactive hydrogen compound employed must not be sufficiently hydophobic in itself so that a surfactant could be obtained merely by condensing a solubilizing amount of ethylene oxide therewith. If the latter type of reactive hydrogen compound were used, such as cetyl alcohol, flexibility of properties would be largely lost since the hydrophobic characteristic would be dominated by the starting material.

It will be noted that the starting material-reactive hydrogen compound generally has very little effect on the properties of the compositions of the invention, since by definition, the reactive hydrogen compound cannot be one which contributes significantly to the hydrophobic characteristic of the composition. This is true in spite of the fact that a major distinction from the prior art in the compositions of the invention lies in the fact that a hereindefined reactive hydrogen compound is employed as discussed above. The reactive hydrogen compound used in preparing the compositions of this invention and in carrying out the method of the invention must fulfill two conditions, initially:

(1) Its reactive hydrogen atoms must be sufficiently labile to open the epoxide ring of ethylene oxide; and (2) The reactive hydrogen compound must react with methyl magnesium iodide to liberate methane in the classical Zerewitinoff reaction (see Niederl and Niederl, Micromethods of Quantitative Organic Analysis, page 263, John Wiley & Sons, New York City, 1946).

Furthermore, as stated hereinabove, the reactive hydrogen compound must be a relatively low molecular weight, water-soluble compound, such as one having up to about 6 carbon atoms, and must have only a single reactive hydrogen atom. It will be recognized, however, that a fairly broad range of reactive hydrogen compounds falls within this definition.

Thus, the lower molecular weight, monohydroxy alcohols constitute one class of reactive hydrogen compounds that is especially useful in preparing the compositions of this invention. Such alcohols can have up to about 6, inclusive, carbon atoms per molecule and examples of these materials are methanol, n-propanol, n-butanol, n-hexanol, methyl ether of ethylene glycol and phenol.

In this connection, it probably would be well to point out that the hydrogen atom in the hydroxyl radical attached to a tertiary carbon atom has been recognized as being unreactive with alkylene oxides, such as ethylene oxide and propylene oxide, under conventional base-catalyzed reaction conditions, so such compounds as tertiary butanol, alpha- or beta-terpineol are not reactive hydrogen compounds adaptable for use in preparing the compositions of the invention. Actually, tertiary butanol has been recommended in the prior art as a solvent for base-catalyzed alkylene oxide reactions because of its unreactivity therewith and we have found that alpha- and beta-terpineol do not react with ethylene oxide, or propylene oxide for that matter, under conventional base-catalysis conditions.

Another class of reactive hydrogen compounds that can be used is secondary amines, such as dimethylamine, diethylamine, morpholine, N-ethylbutylamine, dipropylamine, N-methylethylamine, N-ethylpropylamine, and the like. A further class of reactive hydrogen compounds is N-monosubstituted amides, such as methyl acetamide, N-ethylbenzenesulfonamide, N-propylethanesulfonamide, and the like. A still further class is monocarboxylic acids, such as acetic acid, benzoic acid, butanoic acid, and the like. Still other such reactive hydrogen compounds can also be used so long as the particular compound meets the requirements set forth, i.e., relatively low molecular weight, reactivity with ethylene oxide and only a single reactive hydrogen atom.

Thus, the surface active agents of this invention are prepared by condensing a mixture of propylene oxide and ethylene oxide with a reactive hydrogen compound such as those described above. The mixture of propylene oxide and ethylene oxide can have from 5–40 weight percent of ethylene oxide and products having the most desirable and most distinctive combination of the properties we have tested have from about 10–30 weight percent of ethylene oxide in the propylene oxide-ethylene oxide mixture used.

The amount of the propylene oxide-ethylene oxide mixture used is that which provides a polymer with the reactive hydrogen compound such that the molecular weight of the heteric polymeric chain of oxypropylene and oxyethylene groups is at least about 400. Below this molecular weight surface activity is not obtained in the products since neither the reactive hydrogen compound (by definition) nor the heteric polymeric chain of oxypropylene and oxyethylene groups is in this case sufficiently hydrophobic so that a surfactant is obtained upon the subsequent condensation with ethylene oxide. The molecular weight can range up to 25,000, or higher, and satisfactory surfactant products are obtained throughout this range. Usually, the molecular weight of the heteric polymeric chain of oxypropylene and oxyethylene groups is about 1000 to 10,000.

The heteric polymeric chain of oxypropylene and oxyethylene groups is attached at one end thereof to the nucleus of the reactive hydrogen compound at the site of its reactive hydrogen atom. Thereafter, ethylene oxide is condensed with the reactive hydrogen compound-oxypropylene-oxyethylene condensate so as to attach a solubilizing chain of oxyethylene groups on to the other end of the heteric polymeric chain of oxypropylene and oxyethylene groups. The amount of ethylene oxide used to provide the solubilizing chain is that amount which provides a chain of oxyethylene groups which constitutes from 5–90 weight percent of the total composition.

The compounds of this invention which contain 20–80% of oxyethylene units are in the main excellent laundry detergents and especially good properties are obtained when the polyoxyethylene chains constitute 30–70% of the product. On the other hand, the compounds of this invention which contain 5–20% of oxyethylene units generally find their principal fields of application in other industrial arts. In particular, many compounds which contain 5–20% of oxyethylene units have a relatively high solubility in many nonpolar solvents and for this reason may be employed as surface active agents in formulated dry cleaning solvents. Another outstanding characteristic of the compounds having low oxyethylene contents is their extraordinary ability to remove grease from raw wool, as measured by the method of Barnett and Powers (The Journal of the Society of Cosmetic Chemists, vol. 2, page 219 (1951)). Compounds having high oxyethylene contents of 80–90% are excellent dispersing agents.

In addition to its influence on surface active properties, the oxyethylene content has an important effect on the physical properties of the surface active agents of this invention. At relatively low oxyethylene contents, e.g. 5–30%, the compounds are liquids having the consistency of light lubricating oils. As the oxyethylene content is increased the compounds become more viscous until at about 65% oxyethylene content they assume the properties of a paste and as the oxyethylene content is further increased they become progressively higher melting and assume the properties of waxes at about 80% oxyethylene content. This feature of these compounds is very desirable, since highly active surface active agents can be prepared in a wide variety of physical forms. Of particular significance is the fact that nonionic detergents containing 100% active agent can be prepared in the solid state.

Our invention set forth herein can also be stated in terms of the new method by which the compositions of the invention are prepared. The conditions and catalyst for the chemical reactions involved are those conventionally employed in alkylene oxide condensation reactions. The method is new in that a mixture of propylene oxide and ethylene oxide having 5–40 weight percent ethylene oxide is condensed with a relatively low molecular weight reactive hydrogen compound having a single reactive hydrogen atom to form a heteric polymeric chain of oxypropylene and oxyethylene groups having a molecular weight of at least about 400 and up to 25,000 on the reactive hydrogen compound at the site of its reactive hydrogen atom, followed by condensation of ethylene oxide with the first product obtained as described above so that a solubilizing chain of oxyethylene groups is attached to the heteric polymeric chain of oxypropylene and oxyethylene groups, the weight of ethylene oxide so employed being such that the oxyethylene chain constitutes 5–90 weight percent of the total composition.

As has been stated, the actual conditons employed in carrying out the alkylene oxide condensation reactions which are necessary in order to obtain the compositions and in order to carry out the method of the invention are well known in the art. The disclosure of Jackson et al. in U.S. 2,677,700, column 6, sets these conditions forth, and this disclosure in combination with the disclosure in our examples to follow describes the alkylene oxide reactions adequately. The compositions of this invention are particularly useful as detergents and tests which we have made on the compositions of the invention to show their usefulness as detergents include the Carbon Soil Removal Test, described in U.S. 2,677,700, column 14, lines 50–75, column 15, lines 1–75, and column 16, lines 1–6. The result of this test is a Carbon Soil Removal value taken at either 90° F. or 140° F. for the test compositions which expresses its detergency in terms of its percentage effectiveness when compared to the standard 0.25% solution of sodium kerylbenzenesulfonate described in the test procedure. Other tests which we have made relate to the cloud point and foam height produced by the compositions under controlled conditions.

The cloud point test is carried out by heating a 10 weight percent solution of the test composition in distilled water in a test tube placed in a water bath. The water bath is gradually heated at a rate of about one degree a minute and so that the bath temperature is not more than 5–10 degrees centigrade higher than the test solution particularly near the cloud point. The test solution is agitated by a low-speed propeller-type stirrer and the cloud point observation of the test solution is made against a dark background. The cloud point is taken as the temperature at which definite milky striations or minute but discrete particles of a separate phase are observed.

The foam height test is carried out by placing 10 liters of a 0.10 weight percent solution of the test composition in tap water in a Pyrex glass jar measuring 10″ in diameter and 10″ in height. The Pyrex jar is equipped with a propeller-type stirrer, knife blade heaters, a thermoregulator and a thermometer. A small, centrifugal pump is arranged to circulate the solution in the jar through a calibrated glass flow meter to a jet orifice prepared from the base of a No. 20 Becton, Dickinson and Company hypodermic needle by enlarging the hole in the base with a No. 56 twist drill. The jet orifice is mounted coaxially inside a Pyrex glass tube (51 mm. by 910 mm.) which is placed vertically in the solution. The jet is arranged so that it is 600 mm. above the surface of the solution in the jar, and the Pyrex glass tube is arranged so as to project 210 mm. below the surface of the solution. The test solution is heated to and maintained at 120° F. The centrifugal pump is started and a flow rate of 400 ml. per minute of the solution is metered through the jet. The flow is adjusted by by-passing part of the solution stream back into the jar before passage through the flow meter. The solution passing through the jet is directed against the wall of the vertical tube while the flow is adjusted and while the temperature is brought to equilibrium in order to prevent foaming prior to the actual test. The jet is then arranged so as to pass the solution coaxially downward through the tube without touching the tube walls to impinge upon the surface of the solution located in the Pyrex tube. Time is measured from the instant the solution impinges on the liquid surface and the resulting foam is measured at the end of 10 minutes. The foam height readings are obtained from a calibration on the outside of the Pyrex tube with the zero mark at the surface of the solution and are expressed in millimeters.

We have found that the compositions of this invention have entirely different combinations of these three detergency properties, carbon soil removal value, cloud point and foam height, than the compositions of the Jackson et al. patent. Generally, the compositons of this invention have significantly lower cloud points and foam heights and these trends in combination with the distinctly different carbon soil removal values make our compositions a definite advance in the art since flexibility in properties of surfactants based on alkylene oxide block polymers is increased. These facts will become apparent from the examples which follow and particularly the direct comparisons of the properties of the compositions of the invention and the compositions of the Jackson et al.

reactor while maintaining a reaction temperature in the range of 40–125° C. and an average pressure of up to 90 p.s.i.g. The total reaction time varied from about 2–19 hours. Because of volume limitations imposed by the reactor, the initial heteric polymer of the reactive hydrogen compound, propylene oxide and ethylene oxide was made in stages, taking the indicated amount of the first stage (A) and charging it back into the reactor for further reaction with the propylene oxide-ethylene oxide mixture as indicated.

When the condensate with the reactive hydrogen compound was thus obtained having the proper molecular weight in the heteric oxypropylene-oxyethylene chain, the indicated amount of same was charged to the reactor and ethylene oxide was then admitted under the indicated reaction conditions in the amount necessary to obtain a solubilizing polyoxyethylene chain which constituted the desired weight percent of the total composition. Compositions according to this invention were thus prepared and the reactions are summarized below in Table I.

Table 1.—Compositions of invention—Summary of reaction conditions

| Ex. No. | Reactive hydrogen compound (RHC) used | Stage | Amount RHC (or oxyalkylene condensate from previous stage) used, grams (mols) | Amount catalyst [1] used, grams | Amount of propylene oxide (PO) and ethylene oxide (EO) mixture | | | | | Ethylene oxide [2], grams (mols) | Total reaction time, hrs. | Avg. temp., ° C. | Avg. press. p.s.i.g. |
|---|---|---|---|---|---|---|---|---|---|---|---|---|---|
| | | | | | PO | | EO | | Wt. ratio of PO/EO | | | | |
| | | | | | Grams | Mols | Grams | Mols | | | | | |
| 1 | n-Hexanol | A | RHC-400 (3.92) | a-36.6 | 1,872 | 32.3 | 468 | 10.6 | 80/20 | | 8.5 | 125 | 4 |
| | | B | A-400 (0.80) | | 1,580 | 27.3 | 270 | 6.1 | 80/20 | | 7.5 | 125 | 60 |
| | | C | B-800 (0.29) | | | | | | | 400 (9.1) | 2.8 | 125 | 55 |
| 2 | Methanol | A | RHC-400 (12.50) | a-116.9 | 2,040 | 35.2 | 360 | 8.2 | 85/15 | | 10.7 | 50 | 20 |
| | | B | A-400 (1.79) | | 2,090 | 36.0 | 370 | 8.4 | 85/15 | | 15.2 | 90 | 45 |
| | | C | B-400 (0.25) | | 298 | 5.1 | 52 | 1.2 | 85/15 | 375 (8.5) | 5.8 | 125 | 45 |
| 3 | Diethylamine | A | RHC-382 (5.24) | b-68.0 | 229 | 3.9 | 57 | 1.3 | 80/20 | | 2.5 | 40 | 1 |
| | | B | A-400 (3.13) | a-29.2 | 1,920 | 33.1 | 480 | 1.1 | 80/20 | | 10.3 | 125 | 25 |
| | | C | B-400 (0.45) | | 752 | 13.0 | 188 | 4.3 | 80/20 | 670 (15.2) | 9.4 | 125 | 60 |
| 4 | Morpholine | A | RHC-415 (4.77) | b-70.0 | 224 | 3.9 | 40 | 0.9 | 85/15 | | 2.0 | 90 | 8 |
| | | B | A-400 (2.82) | a-26.4 | 2,057 | 35.6 | 363 | 8.2 | 85/15 | | 7.7 | 125 | 30 |
| | | C | B-400 (0.40) | | 1,020 | 17.6 | 180 | 4.1 | 85/15 | 800 (18.2) | 8.3 | 125 | 50 |
| 5 | Acetic acid | A | RHC-340 (5.68) | c-109.0 | 2,280 | 39.3 | 120 | 2.7 | 95/5 | | 18.6 | 100 | 70 |
| | | B | A-400 (0.96) | | 2,062 | 35.6 | 108 | 2.5 | 95/5 | | 24.1 | 127 | 85 |
| | | C | B-600 (0.23) | | | | | | | 300 (6.8) | 3.3 | 125 | 55 |
| 6 | Benzoic acid | A | RHC-300 (2.46) | a-23.0 | 216 | 3.7 | 24 | 0.5 | 90/10 | | 9.3 | 125 | 1 |
| | | B | A-400 (2.24) | | 2,070 | 35.8 | 230 | 5.2 | 90/10 | | 14.2 | 125 | 60 |
| | | C | B-400 (0.33) | | 419 | 7.2 | 47 | 1.1 | 90/10 | 433 (9.8) | 18.6 | 135 | 90 |
| 7 | n-Propanol | A | RHC-448 (7.48) | d-27 | 2,028 | 35.0 | 223 | 5.07 | 90/10 | | 3.8 | 125 | 40 |
| | | B | A-829 (2.30) | | 1,449 | 25.0 | 161 | 3.66 | 90/10 | | 4.3 | 125 | 45 |
| | | C | B-1,000 (0.94) | | | | | | | 1,000 (22.8) | 3.8 | 125 | 59 |

[1] a=potassium hydroxide; b=water; c=potassium hydroxide catalyst added as potassium acetate; d= sodium hydroxide.
[2] Ethylene oxide used for solubilizing chain only.

patent. The examples are supplied in order to exemplify the compositions and method of the invention and should not be employed to unduly limit the scope of our invention when due regard is given to the description given hereinabove and to follow.

EXAMPLES

A series of surfactant compositions was prepared employing reactive hydrogen compounds exemplary of the classes of such materials disclosed hereinabove in accordance with this invention. The procedure which exemplifies the method of this invention was generally the same throughout although variations in operating conditions and equipment were made to a certain extent in order to expedite the reactions and because of volume limitations dictated by the reactors employed.

The reactor employed was a one gallon, stainless steel autoclave equipped with a stirrer, thermocouple, pressure gage and reactant inlet tube that was directly below the stirrer. The exact conditions, materials and weights of materials used are summarized in Table I below. In general, the reactive hydrogen compound and catalyst were initially charged into the reactor. The amount of catalyst charged to the reactor at the start of each stage is indicated in Table I and a dash (—) means that no additional catalyst was used.

A mixture of propylene oxide and ethylene oxide having the weight ratio indicated was then admitted to the Thus, Table I above summarizes the conditions under which surfactant compositions according to the present invention were prepared. These compositions are summarized in Table II below which reports the reactive hydrogen compound used, the weight percent of the total composition attributable to the oxyethylene groups and the total theoretical molecular weight of the heteric oxypropylene-oxyethylene chain.

Table II.—Compositions of invention

| Ex. No. | Reactive hydrogen compound | Heteric oxypropylene (PO)—oxyethylene (EO) chains | | Oxyethylene chains, wt. percent |
|---|---|---|---|---|
| | | Mol. wt.[1] | Wt. ratio PO/EO | |
| 1 | n-Hexanol | 2,800 | 80/20 | 33 |
| 2 | Methanol | 3,000 | 85/15 | 33 |
| 3 | Diethylamine | 3,000 | 80/20 | 33 |
| 4 | Morpholine | 4,000 | 85/15 | 33 |
| 5 | Acetic acid | 2,600 | 95/5 | 33 |
| 6 | Benzoic acid | 2,600 | 90/10 | 33 |
| 7 | n-Propanol | 1,060 | 90/10 | 50 |

[1] Includes molecular weight of reactive hydrogen compound.

A parallel series of surfactant compositions according to the Jackson et al. patent, U.S. 2,677,700, was also prepared wherein the reactive hydrogen compound was initially condensed with propylene oxide and the thus produced polyoxypropylene glycol ether was then condensed with ethylene oxide. These compositions were prepared with the proper amount of propylene oxide and ethylene oxide so that the weight percent oxyethylene groups and molecular weight of the oxypropylene chain were the same as these values present in the compositions according to this invention summarized above in Tables I and II. Thus, direct comparisons were then possible and were made so as to demonstrate the difference in detergency properties between the compositions of the invention and the compositions of the Jackson et al. patent.

The compositions according to the Jackson et al. patent were prepared in stages following the same general procedure and with the same equipment as that already described for the compositions of the invention summarized in Tables I and II. The significant difference from the method employed in the examples recorded in Table I and II is, of course, that the reactive hydrogen compound was initially condensed with propylene oxide in the examples in Table III rather than with a mixture of propylene oxide and ethylene oxide in accordance with this invention.

The preparation of the compositions of the Jackson et al. patent is summarized below in Table III.

the compositions of the invention are summarized below in Table IV showing the reactive hydrogen compound used, the molecular weight of the oxypropylene chain and the weight percent of each composition attributable to the oxyethylene groups.

Table IV.—Compositions of U.S. 2,677,700

| Ex. No. | Reactive hydrogen compound | Oxypropylene chain, mol. wt.[1] | Oxyethylene chain, wt. percent |
|---|---|---|---|
| 8 | n-Hexanol | 2,800 | 33 |
| 9 | Methanol | 3,000 | 33 |
| 10 | Diethylamine | 3,000 | 33 |
| 11 | Morpholine | 4,000 | 33 |
| 12 | Acetic acid | 2,600 | 33 |
| 13 | Benzoic acid | 2,600 | 33 |
| 14 | n-Propanol | 1,060 | 50 |

[1] Includes molecular weight of reactive hydrogen compound.

Compositions according to this invention summarized in Table II and compositions according to the Jackson et al. patent summarized in Table IV were tested for detergency as reflected by their carbon soil removal values as well as for cloud points and foam heights according to the procedures previously set forth for these tests. The Table III.—Compositions of U.S. 2,677,700—Summary of reaction conditions

| Ex. No. | Reactive hydrogen compound (RHC) used | Stage | Amount RHC (or oxyalkylene condensate from previous stage) used, grams (mols) | Amount catalyst[1] used, grams | Amount propylene oxide added | | Amount ethylene oxide added | | Total reaction time, hrs. | Avg. temp., °C. | Avg. press. p.s.i.g. |
|---|---|---|---|---|---|---|---|---|---|---|---|
| | | | | | Grams | Mols | Grams | Mols | | | |
| 8 | n-Hexanol | A | RHC-400 (3.92) | a-36.6 | 2,345 | 40.0 | | | 6.9 | 125 | 20 |
| | | B | A-500 (0.72) | | 2,000 | 34.5 | | | 6.1 | 125 | 60 |
| | | C | B-1,100 (0.39) | | | | 550 | 12.5 | 3.0 | 125 | 50 |
| 9 | Methanol | A | RHC-400 (12.50) | a-116.9 | 2,400 | 41.4 | | | 11.7 | 75 | 30 |
| | | B | A-400 (1.79) | | 2,460 | 42.4 | | | 11.7 | 90 | 50 |
| | | C | B-400 (0.25) | | | | 375 | 6.5 | 4.8 | 125 | 35 |
| 10 | Diethylamine | A | RHC-191 (2.60) | b-34.0 | 350 | 6.0 | | | 5.3 | 50 | 1 |
| | | B | A-250 (1.91) | a-17.9 | 151 | 5.8 | | | 6.5 | 135 | 50 |
| | | C | B-700 (0.70) | | 1,660 | 28.6 | | | 6.1 | 125 | 50 |
| | | D | C-900 (0.30) | | 1,635 | 28.2 | 450 | 10.2 | 2.0 | 125 | 50 |
| 11 | Morpholine | A | RHC-348 (3.32) | b-61.0 | 193 | 3.3 | | | | 90 | 1 |
| | | B | A-400 (2.76) | a-25.8 | 2,360 | 40.6 | | | 7.3 | 100 | 35 |
| | | C | B-500 (0.50) | | 1,500 | 25.9 | | | 7.7 | 125 | 60 |
| | | D | C-900 (0.23) | | | | 450 | 10.2 | 3.0 | 125 | 75 |
| 12 | Acetic acid | A | RHC-340 (6.67) | c-109.0 | 2,400 | 41.5 | | | 8.8 | 125 | 60 |
| | | B | A-400 (1.10) | | 2,075 | 35.7 | | | 7.9 | 125 | 70 |
| | | C | B-800 (0.31) | | | | 400 | 9.1 | 2.0 | 125 | 85 |
| 13 | Benzoic acid | A | RHC-366 (3.00) | a-28.0 | 174 | 3.0 | | | 9.0 | 140 | 1 |
| | | B | A-400 (2.22) | a-10.0 | 2,300 | 39.6 | | | 11.0 | 135 | 75 |
| | | C | B-400 (0.33) | | 500 | 8.6 | 425 | 9.7 | 15.9 | 135 | 95 |
| 14 | n-Propanol | A | RHC-442 (7.36) | d-24.5 | 2,210 | 36.2 | | | 4.0 | 125 | 40 |
| | | B | A-900 (2.50) | | 1,751 | 30.2 | | | 5.8 | 125 | 42 |
| | | C | B-1,000 (0.94) | | | | 1,000 | 22.7 | 3.3 | 125 | 64 |

[1] a=potassium hydroxide; b=water; c=potassium hydroxide added as potassium acetate; d=sodium hydroxide.

The compositions of the Jackson et al. patent which were prepared in order to make direct comparisons with results of these comparison tests are set forth below in Table V.

Table V.—Comparison of detergency, foam height and cloud point properties—Compositions of invention and compositions of U.S. 2,677,700

| Ex. No. | Reactive hydrogen compound (RHC) | Composition of invention | | | Composition of U.S. 2,677,700 | | Carbon soil removal | | Foam height at 120° F., mm. | Cloud point, °C. |
|---|---|---|---|---|---|---|---|---|---|---|
| | | Heteric oxypropylene chain | | Oxyethylene chain, wt. percent | Oxypropylene chain, mol. wt. | Oxyethylene chain, wt. percent | 90° F. | 140° F. | | |
| | | Mol. wt.[1] | PO/EO ratio | | | | | | | |
| 1 | n-Hexanol | 2,800 | 80/20 | 33 | | | 190 | 220 | 63 | 50.0 |
| 8 | ...do... | | | | 2,800 | 33 | 169 | 124 | 455 | 53.0 |
| 2 | Methanol | 3,000 | 85/15 | 33 | | | 110 | 264 | 92 | 58.0 |
| 9 | ...do... | | | | 3,000 | 33 | 161 | 127 | 25 | 19.0 |
| 3 | Diethylamine | 3,000 | 80/20 | 33 | | | 137 | 294 | 125 | 65.5 |
| 10 | ...do... | | | | 3,000 | 33 | 223 | 198 | [2] 445 | 50.0 |
| 4 | Morpholine | 4,000 | 85/15 | 33 | | | 178 | 297 | [2] 260 | 56.0 |
| 11 | ...do... | | | | 4,000 | 33 | 291 | 308 | [2] 130 | 41.5 |
| 5 | Acetic acid | 2,600 | 95/5 | 33 | | | 145 | 226 | 24 | 21.0–41.0 |
| 12 | ...do... | | | | 2,600 | 33 | 138 | 267 | 125 | 38.5 |
| 6 | Benzoic acid | 2,600 | 90/10 | 33 | | | 122 | 245 | 12 | 7.0 |
| 13 | ...do... | | | | 2,600 | 33 | 120 | 174 | 11 | Turbid |
| 7 | n-Propanol | 1,060 | 90/10 | 50 | | | 179 | 255 | 600 | 79.3 |
| 14 | ...do... | | | | 1,060 | 50 | 227 | | | 78.5 |

[1] Includes molecular weight of reactive hydrogen compound.
[2] Flow rate was 300 ml./min.

It will be apparent from a review of the data recorded in Table V that the major objective of this invention has been accomplished. That is, flexibility in the properties of surface active agents based on block polymers of propylene oxide and ethylene oxide has been significantly increased by our concept of initially condensing a defined mixture of propylene oxide and ethylene oxide with a relatively low molecular weight reactive hydrogen compound having only a single reactive hydrogen atom and then condensing ethylene oxide therewith. The tests made and results thereof show unmistakably that the compositions of this invention have distinctly different combinations of properties than do the compositions of the Jackson et al. patent wherein propylene oxide, itself, is condensed with the reactive hydrogen compound in order to form the hydrophobic element of the surfactant compositions. The distinction is most apparent in the carbon soil removal value measured at 140° F. although the foam height and cloud point values are also definitely changed. It will be noted that in most cases (see Examples 1, 2, 3, 4 and 6) the carbon soil removal value at 140° F. is significantly increased in the compositions of the invention. In four cases (see Examples 1, 3, 5 and 7) the foam height is greatly reduced. In all cases, an entirely new set or combination of properties is provided by the compositions of the invention.

We claim:

1. A surface active mixture of conjugated polyoxyalkylene compounds consisting of oxypropylene groups, oxyethylene groups and the nucleus of morpholine as a reactive hydrogen compound having only a single reactive hydrogen atom, said compounds being characterized by having a heteric polymeric chain of oxypropylene and oxyethylene groups attached at one end thereof to said nucleus of morpholine at the site of its reactive hydrogen atom and by having a chain of oxyethylene groups attached to the other end of said heteric chain, said heteric polyoxypropylene-polyoxyethylene chain having from five to 40 weight percent of oxyethylene groups, based on the weight of said heteric chain, and having an average molecular weight of at least about 400 and up to about 25,000 and the oxyethylene groups in said oxyethylene chain being sufficient in weight so as to constitute from about 20 to 80 weight percent of the mixture of surface active compounds.

2. A surface active mixture of conjugated polyoxyalkylene compounds consisting of oxypropylene groups, oxyethylene groups and the nucleus of an alkanoic acid as a reactive hydrogen compound having only a single reactive hydrogen atom and having not over about six carbon atoms, said compounds being characterized by having a heteric polymeric chain of oxypropylene and oxyethylene groups attached at one end thereof to said nucleus of the alkanoic acid reactive hydrogen compound at the site of its reactive hydrogen atom and by having a chain of oxyethylene groups attached to the other end of said heteric chain, said heteric polyoxypropylene-polyoxyethylene chain having from five to 40 weight percent of oxyethylene groups, based on the weight of said heteric chain, and having an average molecular weight of at least about 400 and up to about 25,000 and the oxyethylene groups in said oxyethylene chain being sufficient in weight so as to constitute from about 20 to 80 weight percent of the mixture of surface active compounds.

3. A surface active mixture of conjugated polyoxyalkylene compounds consisting of oxypropylene groups, oxyethylene groups and the nucleus of a secondary dialkylamine as a reactive hydrogen compound having only a single reactive hydrogen atom and having not over about six carbon atoms, said compounds being characterized by having a heteric polymeric chain of oxypropylene and oxyethylene groups attached at one end thereof to said nucleus of the secondary dialkylamine reactive hydrogen compound at the site of its reactive hydrogen atom and by having a chain of oxyethylene groups attached to the other end of said heteric chain, said heteric polyoxypropylene-polyoxyethylene chain having from five to 40 weight percent of oxyethylene groups, based on the weight of said heteric chain, and having an average molecular weight of at least about 400 and up to about 25,000 and the oxyethylene groups in said oxyethylene chain being sufficient in weight so as to constitute from about 20 to 80 weight percent of the mixture of surface active compounds.

References Cited by the Examiner

UNITED STATES PATENTS 2,677,700  5/54  Jackson et al.
3,078,315  2/63  Steele et al. _____ 260—615

LEON ZITVER, *Primary Examiner.*

CHARLES B. PARKER, *Examiner.*